United States Patent
Kurahashi (10) Patent No.: US 8,687,214 B2
(45) Date of Patent: Apr. 1, 2014

(54) IMAGE FORMING APPARATUS COMMUNICATING WITH AN INFORMATION PROCESSING PROCESSING APPARATUS AND A MOBILE TERMINAL

(75) Inventor: Masahiro Kurahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 13/166,670

(22) Filed: Jun. 22, 2011

(65) Prior Publication Data

US 2012/0033245 A1 Feb. 9, 2012

(30) Foreign Application Priority Data

Aug. 4, 2010 (JP) .................................. 2010-175736

(51) Int. Cl.
*G06K 15/00* (2006.01)
*G06F 3/12* (2006.01)

(52) U.S. Cl.
USPC ........................................ 358/1.14; 358/1.15

(58) Field of Classification Search
USPC ............... 358/1.1, 1.13, 1.14, 1.15, 1.9, 1.16, 358/402, 500, 474; 709/201, 203; 707/627, 707/706; 705/52, 330
See application file for complete search history.

(56) References Cited

U.S. PATENT DOCUMENTS

| 6,471,878 | B1 * | 10/2002 | Greene et al. | 216/13 |
| 7,591,415 | B2 * | 9/2009 | Jesme | 235/380 |
| 8,134,734 | B2 * | 3/2012 | Greene | 358/1.15 |
| 8,305,607 | B2 * | 11/2012 | Morohoshi | 358/1.15 |
| 8,314,963 | B2 * | 11/2012 | Park | 358/1.15 |
| 8,422,063 | B2 * | 4/2013 | Nishida | 358/1.15 |
| 2005/0029350 | A1 * | 2/2005 | Jusas et al. | 235/451 |
| 2005/0152544 | A1 * | 7/2005 | Kizawa | 380/55 |
| 2006/0184705 | A1 * | 8/2006 | Nakajima | 710/303 |
| 2007/0242301 | A1 * | 10/2007 | Tsuchie et al. | 358/1.14 |
| 2009/0207445 | A1 * | 8/2009 | Kimura | 358/1.15 |
| 2009/0296140 | A1 * | 12/2009 | Sugiyama et al. | 358/1.15 |

FOREIGN PATENT DOCUMENTS

JP 2003150354 A 5/2003

* cited by examiner

*Primary Examiner* — Gabriel Garcia
(74) *Attorney, Agent, or Firm* — Fitzpatrick, Cella, Harper & Scinto (57) ABSTRACT

Provided are an image forming apparatus capable of communicating with an information processing apparatus and a mobile terminal, and a control method of controlling the image forming apparatus. Wireless communication is enabled between the mobile terminal and the image forming apparatus owing to receipt of print data and account information, which is for placing the image forming apparatus in a state in which wireless communication is possible, from the information processing apparatus. After wireless communication is enabled, the image forming apparatus receives authentication information from the mobile terminal and, if this authentication information corresponds to the account information, start printing based upon the print data received from the information processing apparatus.

5 Claims, 10 Drawing Sheets

| ACCOUNT | BLUETOOTH ADDRESS |
|---|---|
| 104×× | 12-34-56-×× |
| 213×× | 34-56-78-×× |
| 333×× | 56-78-9A-×× |

| DEFAULT ACCOUNT | 76543 |
|---|---|
| USER ACCOUNT 1 | 12345 |
| USER ACCOUNT 2 | 13579 |

IMAGE FORMING APPARATUS COMMUNICATING WITH AN INFORMATION PROCESSING PROCESSING APPARATUS AND A MOBILE TERMINAL

BACKGROUND OF THE INVENTION

1. Field of the Invention

The present invention relates to an image forming apparatus capable of wireless communication and a method of controlling this apparatus.

2. Description of the Related Art

An increasing number of printers and image forming apparatuses that receive and print image and document data that has been stored in an information processing apparatus such as a personal computer come equipped with a secure print function. With the secure print function, received print data is not printed immediately. Rather, printing starts in response to authentication information input by the user operating the printer or image forming apparatus. By virtue of the secure print function, only the user executing the print job can obtain and handle the printout. This prevents one's own printout from being seen or carried away by another individual. User authentication employed in the secure print function is implemented by using a card such as a FeliCa card in the image forming apparatus or by entering a password or the like from a console unit on the image forming apparatus. In the case of the former, user authentication is performed based upon information on a card, such as a FeliCa card, having an internal magnetic chip, and user information that has been appended to image information for printing sent from a personal computer to the image forming apparatus (printer). If authentication succeeds, output of the print job commences. In the case of the latter, user authentication is carried out based upon information such as a user name and password entered directly by the user using a console unit and user information that has been appended to image information for printing sent from a personal computer to the image forming apparatus. If authentication succeeds, output of the print job starts.

However, the FeliCa card of the former authentication method requires not only a card reader with which the image forming apparatus is equipped but also a card writer or the like for registering the cards and user names, etc., of all users. A problem which arises is the cost of such equipment. Further, in the case of the latter authentication method, many printers with only a print function have a console unit that is not capable of inputting data. In addition, even if data input from the console unit were possible, a problem encountered is that entering a user name and password is very troublesome.

In order to alleviate the troublesome nature of such authentication and lower the cost of setting up a FeliCa card system, the specification of Japanese Patent Laid-Open No. 2003-150354 proposes a technique in which secure print authentication is performed vicariously by a mobile-terminal wireless communication function such as Bluetooth. In particular, mobile terminals are being provided with greater functionality and possess a mail transceive function and Web browser function and are also capable of transmitting document data such as PDF documents directly to a printer in order to achieve printing. At present, Bluetooth communication or infrared communication is generally available as means for transmitting image information to an image forming apparatus such as a printer or MFP (Multi Function Peripheral), and adopting such means for secure print authentication has been considered.

However, in a case where an image forming apparatus and a mobile terminal perform non-directional wireless communication such as Bluetooth communication, a data input at both the image forming apparatus and mobile terminal is necessary in order to set up the connection (referred to as "pairing"). In such case the user must go to the location of the image forming apparatus while carrying the mobile terminal and must perform an operation using the input unit of the image forming apparatus to start Bluetooth communication. In response, the image forming apparatus starts outputting a Bluetooth signal. The user subsequently searches for and selects a Bluetooth device, which in this case is the image forming apparatus, by using the mobile terminal. Wireless communication between the image forming apparatus and mobile terminal becomes possible and a print job can be executed only after this state is attained. To the user, the operations performed at both the image forming apparatus and mobile terminal and the operation for searching for and selecting the image forming apparatus using the mobile terminal are troublesome tasks. Such operations represent a major impediment for inexperienced users.

SUMMARY OF THE INVENTION

An aspect of the present invention is to eliminate the above-mentioned problems with the conventional technology.

The present invention provides a technique whereby the start of printing of a secure print job can be instructed while omitting the operation performed at the image forming apparatus.

According to an aspect of the present invention, there is provided an image forming apparatus capable of communicating with an information processing apparatus and a mobile terminal, comprising: a reception unit configured to receive print data and account information, which is for placing the image forming apparatus in a state in which wireless communication is possible, from the information processing apparatus; an authentication information reception unit configured to receive authentication information from the mobile terminal after the state in which wireless communication is possible is established by receipt of the account information by the reception unit; and a print control unit configured to start printing based upon the print data in a case where the authentication information received by the authentication information reception unit corresponds to the account information.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

An embodiment of the present invention will now be described hereinafter in detail, with reference to the accompanying drawings. It is to be understood that the following embodiment is not intended to limit the claims of the present invention, and that not all of the combinations of the aspects that are described according to the following embodiment are necessarily required with respect to the means to solve the problems according to the present invention.

Figure 1:
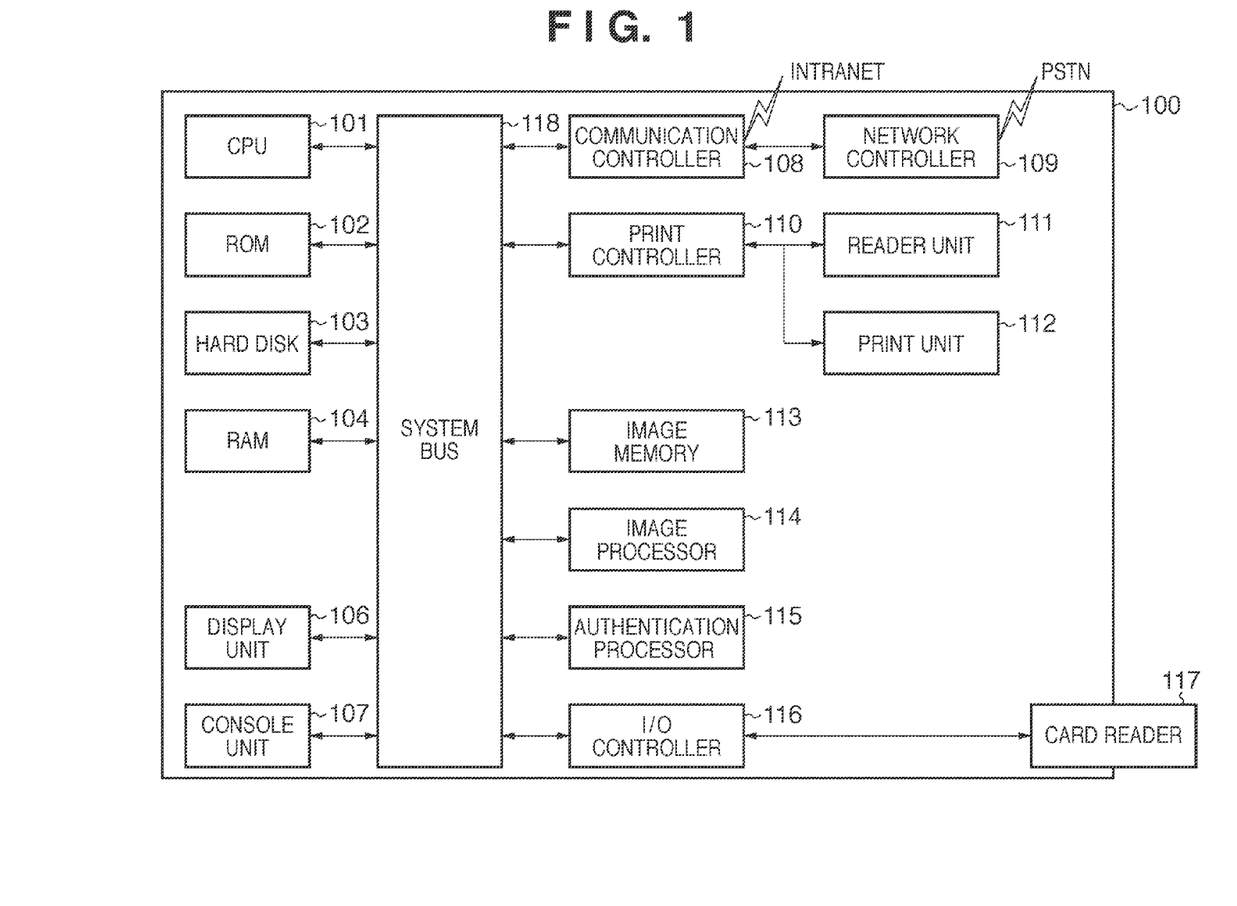
FIG. 1 is a block diagram illustrating the general configuration of a multifunction peripheral (MFP) serving as one example of a printing apparatus according to an embodiment of the present invention.

FIG. 1 is a block diagram illustrating the general configuration of a multifunction peripheral 100 serving as one example of a printing apparatus according to an embodiment of the present invention.

The multifunction peripheral 100 includes a CPU 101 such as a microprocessor, a ROM 102, a hard disk 103 and a RAM 104. The RAM 104 stores various information such as the driving conditions and management data of each of the units connected to a system bus 118. The RAM 104 provides the main memory of the CPU 101 and stores the control program and various data. The CPU 101 executes various processing in accordance with the control program stored in the RAM 104. The program has been installed in the hard disk 103. When the program is to be executed, it is expanded in the RAM 104 and executed under the control of the CPU 101.

The multifunction peripheral 100 includes a display unit 106, a console unit 107, a communication controller 108, a print controller 110, an image memory 113, an image processor 114, an authentication processor 115 and an input/output (I/O) controller 116, etc. The display unit 106 displays various information such as drive conditions, apparatus status and input information, etc. The console unit 107 includes keys such as numeric keys and a start key for allowing the user to input settings and instructions, etc., and further includes a touch-sensitive panel as part of the display unit 106. The communication controller 108 is connected to an intranet or to the Internet via wireless or wired network and executes the sending and receiving of document data, which includes image data, and control commands. The communication controller 108 further has a wireless communication control unit (not shown) and is adapted so as to be capable of wireless communication with a mobile terminal. These wireless communication methods include Wi-Fi and Bluetooth, etc.

A network controller 109, which is connected to a PSTN (Public Switched Telephone Network), executes prescribed line control to effect line connect and disconnect at the time of outgoing and incoming calls. The network controller 109 modulates and demodulates image data and control signals by an internal modem, and facsimile signals are sent and received via the network controller 109. A reader unit 111 reads image data by photoelectrically converting reflected light obtained from light that has irradiated a document that is the object of transmission, copying or storage, and transmits, copies or stores the image data via the print controller 110. The image processor 114 compresses and encodes image data to be transmitted, expands and decodes image data that has been received and converts received image data. The image processor 114 further converts image data, which is to be stored, to a suitable format or to a format (e.g., the PDF format, etc.) designated by the user. The image processor 114 further executes image correction processing that conforms to the optical response characteristic of the reader unit 111, sensor variations, etc. A print unit 112 is a printer engine (printing unit) having a print function. In response to a request, the image processor 114 applies optimization processing and the like to image data suited to the printing characteristics, etc., of the print unit 112.

The authentication processor 115 performs print job authentication in addition to user and user group authentication. A card reader 117, which is for delivering and receiving commands and data to and from a contactless IC card using short-range wireless communication such as NFC, transmits or gives notification of data such as user information via the I/O controller 116. The card reader 117 has a portion (not shown) for accommodating a supported card that has been inserted.

The system bus 118 interconnects the CPU 101, ROM 102, hard disk 103, RAM 104, display unit 106, console unit 107, communication controller 108, print controller 110, image memory 113, image processor 114 and I/O controller 116. Accordingly, the multifunction peripheral 100 has a facsimile function for transmitting image data that has been read by the reader unit 111, a transfer function for transferring data to a server or the like, and a copy function for printing read image data using the print unit 112. The multifunction peripheral 100 further has a facsimile reception function for receiving image data by facsimile and printing the image data, and a print function for receiving and printing print data from a client computer. Thus the multifunction peripheral 100 can be used not only as a copier but also as a facsimile machine, printer apparatus and scanner apparatus. It should be noted that the print unit 112 may be equipped with a printer engine that uses the ink jet printing method, thermal head printing method or dot impact printing method, etc., in addition to the electrophotographic printing method.

Figure 2:
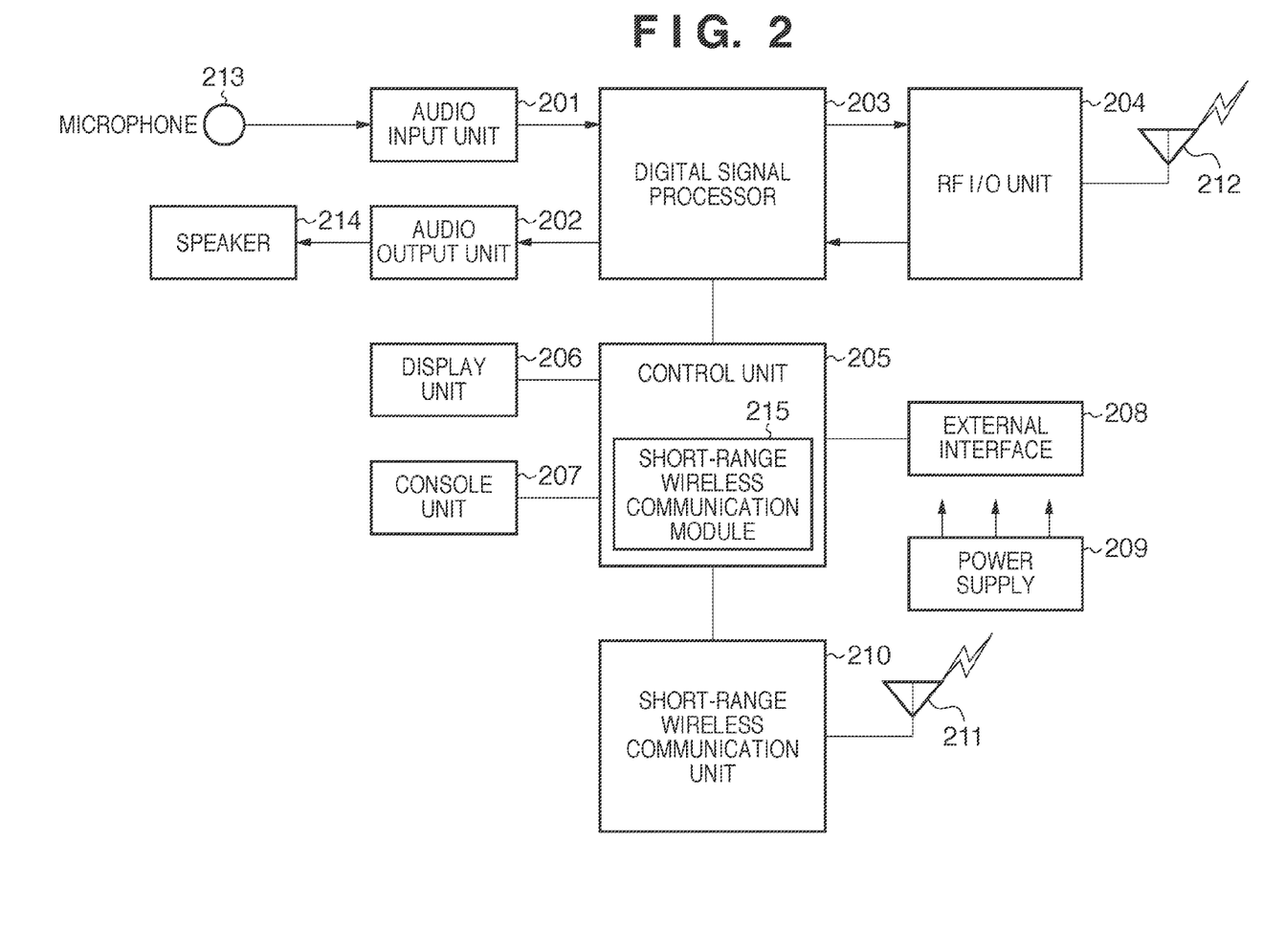
FIG. 2 is a block diagram illustrating the general configuration of a mobile telephone (cellular phone) serving as one example of a mobile terminal.

FIG. 2 is a block diagram illustrating the general configuration of a cellular phone serving as one example of a mobile terminal according to this embodiment. It should be noted that although the arrangement set forth below is described as one example in this embodiment, the present invention is applicable in a variety of forms in relation to the device that is capable of implementing information communication and is not particularly limited to this embodiment.

The cellular phone has a control unit 205 to which are connected a digital signal processor 203, a display unit 206, a console unit 207, an external interface 208 and a short-range wireless communication unit 210. The control unit 205 in the principal component for implementing the functions of the cellular phone and is equipped with a CPU, EEPROM, flash memory and SRAM, etc., none of which are shown. In this embodiment, the control unit 205 includes a short-range wireless communication module 215 for delivering and receiving commands and data to and from the short-range wireless communication unit 210.

The digital signal processor 203 is connected to an audio input unit 201 to which a microphone 213 is connected, an audio output unit 202 to which a speaker 214 is connected, and an RF input/output (I/O) unit 204 to which an antenna 212 is connected, and encodes/decodes a digital audio signal. The audio input unit 201 converts an analog signal from the microphone 213 to a digital signal. The audio output unit 202 amplifies a received digital audio signal and drives the speaker 214, whereby the speaker outputs audio. The RF I/O unit 204 performs high-frequency transmission/reception. The display unit 206, which presents a display of information to the user, has an LCD driver, an LCD display device and the like. The console unit 207 is used to supply the cellular phone with operation information. A power supply 209 supplies each of these components with the necessary power based upon a battery power supply. The short-range wireless communication unit 210, which is connected to the short-range wireless communication module 215 of the control unit 205, delivers and receives data to and from an external terminal via the antenna 211. The short-range wireless communication module 215 is incorporated as part of the control unit 205 and, in a case where short-range wireless communication is by Bluetooth, controls wireless communication by exchanging commands.

Figure 3:
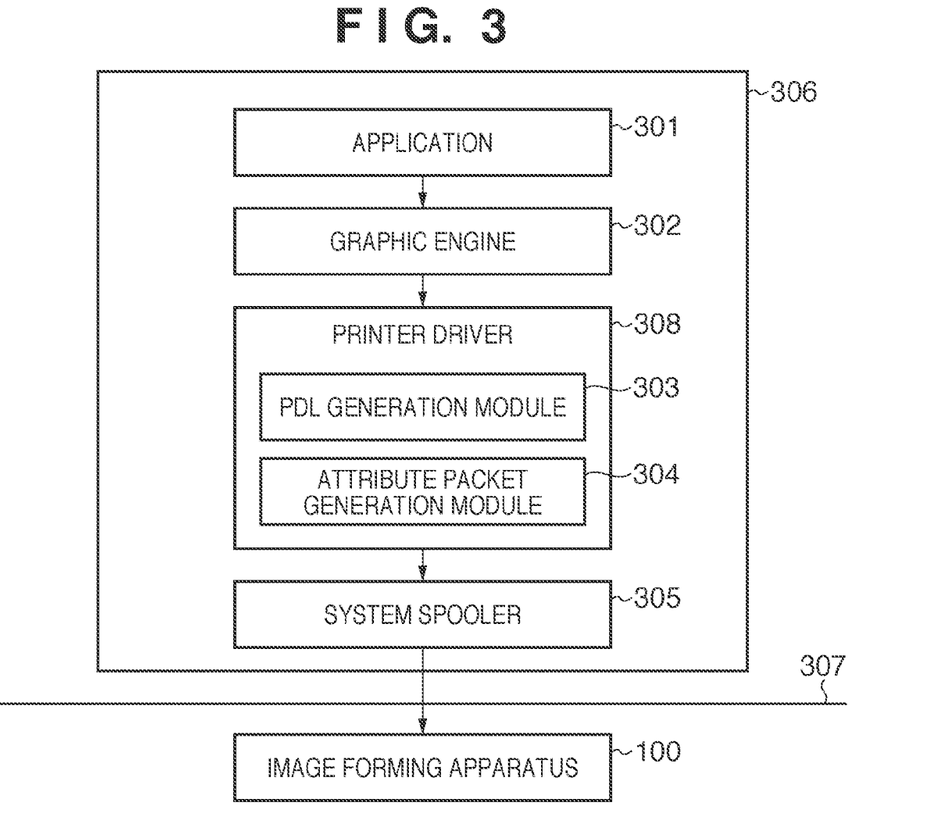
FIG. 3 is a diagram useful in describing the software modules of an information processing apparatus, namely a personal computer.

FIG. 3 is a diagram useful in describing the software modules of an information processing apparatus 306, namely a personal computer according to this embodiment.

The information processing apparatus 306 includes an application 301, a graphic engine 302, a printer driver 308, a system spooler 305, a PDL generation module 303 and an attribute packet generation module 304. The application 301 and printer driver 308 are supplied to the information processing apparatus 306 from a storage medium such as a floppy disk or CD-ROM or to the hard disk of the information processing apparatus 306 via a network 307. When the application 301 instructs the multifunction peripheral 100 to perform printing, an output is produced (an image is drawn) utilizing the graphic engine 302.

The application 301 generates desired document data in response to an operation by the user and outputs document data in the form of a drawing function to the graphic engine 302 supplied by the operating system in response to a print command from the user. In a case where the operating system is the Windows (registered trademark of Microsoft Corp.) operating system, the graphic engine 302 is referred to as a GDI (Graphic Drive Device). The application 301 converts the document data desired to be printed to a drawing function defined by the GDI of the operating system, and outputs the GDI function, which is this drawing function, to the GDI (graphic engine) 302.

Further, upon receiving a command to start printing from the application 301, the graphic engine 302 loads the printer driver 308, which has been provided for every type of image forming apparatus (printing apparatus), to the RAM and sets the output of the application 301 in the printer driver 308. The graphic engine 302 then makes a conversion from the GDI function, which is accepted from the application 301, to a DDI (Device Driver Interface) function and outputs the DDI function to the printer driver 308. On the basis of the DDI function accepted from the graphic engine 302, the printer driver 308 makes a conversion to a control command, an example of which is PDL (Page Description Language), that the printer is capable of recognizing. The printer driver 308 generates print data based upon the print control command obtained by the conversion and outputs the print data to an interface via the system spooler 305 loaded by the operating system.

Further, the printer driver 308 according to this embodiment includes not only the PDL generation module 303, which generates page description language from the DDI function, but also the attribute packet generation module 304. The attribute packet generation module 304 packetizes the generated page description language and generates print data to which attribute information has been attached. Further, the printer driver 308 includes a UI (User Interface) module (not shown) that generates a user interface and supplies the operating system with user interface information.

Figure 4:
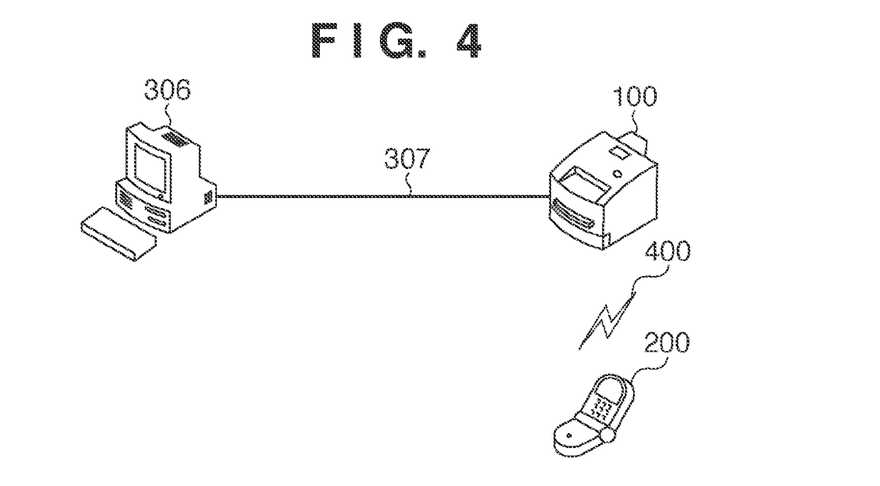
FIG. 4 is a diagram useful in describing the configuration of an image forming system according to this embodiment.

FIG. 4 is a diagram useful in describing the configuration of an image forming system (printing system) according to this embodiment.

A cellular phone 200 is illustrated in FIG. 4 as an example of a mobile terminal employed by a typical user. The multifunction peripheral 100 is connected to the cellular phone 200 via a wireless communication medium 400. The wireless communication medium 400 is a wireless communication medium inclusive of Wi-Fi and Bluetooth. The information processing apparatus 306 such as a personal computer is connected to the multifunction peripheral 100 by a network 307 such as a LAN. Image information representing PDL or the like is transmitted from the information processing apparatus 306 to the multifunction peripheral 100 via the LAN 307, whereupon the multifunction peripheral 100 receives the image information and prints an image based upon this image information. Naturally, these components are general components merely arranged in a conceptual diagram and it goes without saying that the mobile terminal used by a typical user may just as well be another mobile information device. Further, the image forming apparatus need not be the multifunction peripheral 100; a stand-alone device such as a printer or facsimile machine may just as well be connected to the cellular phone 200 via the wireless communication medium 400.

An overview of this embodiment will now be described with reference to FIG. 4.

The user either creates document data (print information) for secure print by using the information processing apparatus 306 or acquires such data and, using the previously installed printer driver 308, instructs the multifunction peripheral 100 to perform printing. At this time, account information necessary for pairing in Bluetooth communication (described later) is set using the printer driver 308. The account information is then appended to the header of the print job (the account is appended to the CPCA) and transmitted to the multifunction peripheral 100 together with the image information to be printed. It should be noted that CPCA stands for "Common Peripheral Controlling Architecture", which establishes a unified control command for office equipment. As a result, the multifunction peripheral 100 sets the received account information as account information for pairing in Bluetooth communication. The user then implements Bluetooth communication using the cellular phone 200, thereby performing authentication for secure print and causing printing to start if authentication succeeds. This embodiment proposes that in secure print authentication, such authentication be carried out by establishing pairing necessary for performing Bluetooth communication. When the user wishes to cause the start of printing that is based upon secure print, a search for a Bluetooth device (printer) is conducted. Since account information has already been transmitted from the information processing apparatus 306 to the multifunction peripheral 100, a signal necessary for the Bluetooth device search is being output from the multifunction peripheral 100. As a result, the Bluetooth device name of the multifunction peripheral 100 is displayed on the display unit 206 of the cellular phone 200 and the user selects this device.

In the next stage of the process, a screen prompting the user to enter account information (authentication information) is displayed on the display unit 206 of the cellular phone 200, and the user responds by entering the account information that was input earlier using the printer driver 308 of the information processing apparatus 306. The cellular phone 200 performs Bluetooth communication with the multifunction peripheral 100 and transmits the account information to the multifunction peripheral 100. By executing processing for receiving this authentication information, the multifunction peripheral 100 compares the account information received from the cellular phone 200 with the account information received from the information processing apparatus 306 and starts secure print when the two items of information match.

Figure 5:
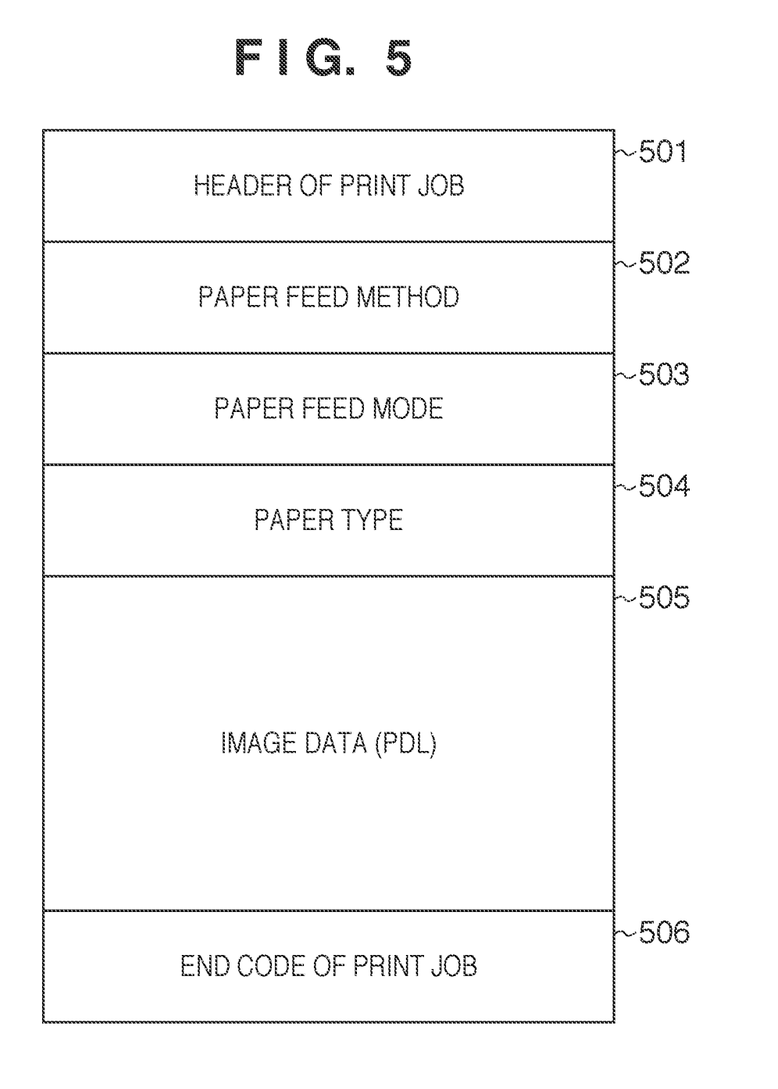
FIG. 5 is a diagram illustrating an example of the data structure of a print job according to this embodiment.

FIG. 5 is a diagram illustrating an example of the data structure of a print job according to this embodiment.

The print job has a header 501, information blocks, namely a paper feed method 502, a paper feed mode 503 and a paper type 504, image data (drawing data) 505 and a print-job end code 506.

The print job is transmitted from the information processing apparatus 306 to the multifunction peripheral 100. The multifunction peripheral 100 analyzes the contents of the print job and is capable of executing the print job using the paper feed method and in the paper feed mode that have been designated by this print job. The header 501 of the print job, the paper feed method 502, paper feed mode 503, paper type 504 and print-job end code 506 are each generated by the attribute packet generation module 304 of the printer driver 308. A characterizing feature of this embodiment is that the header 501 of the print job includes account information necessary to achieve pairing with the cellular phone 200.

Figure 6:
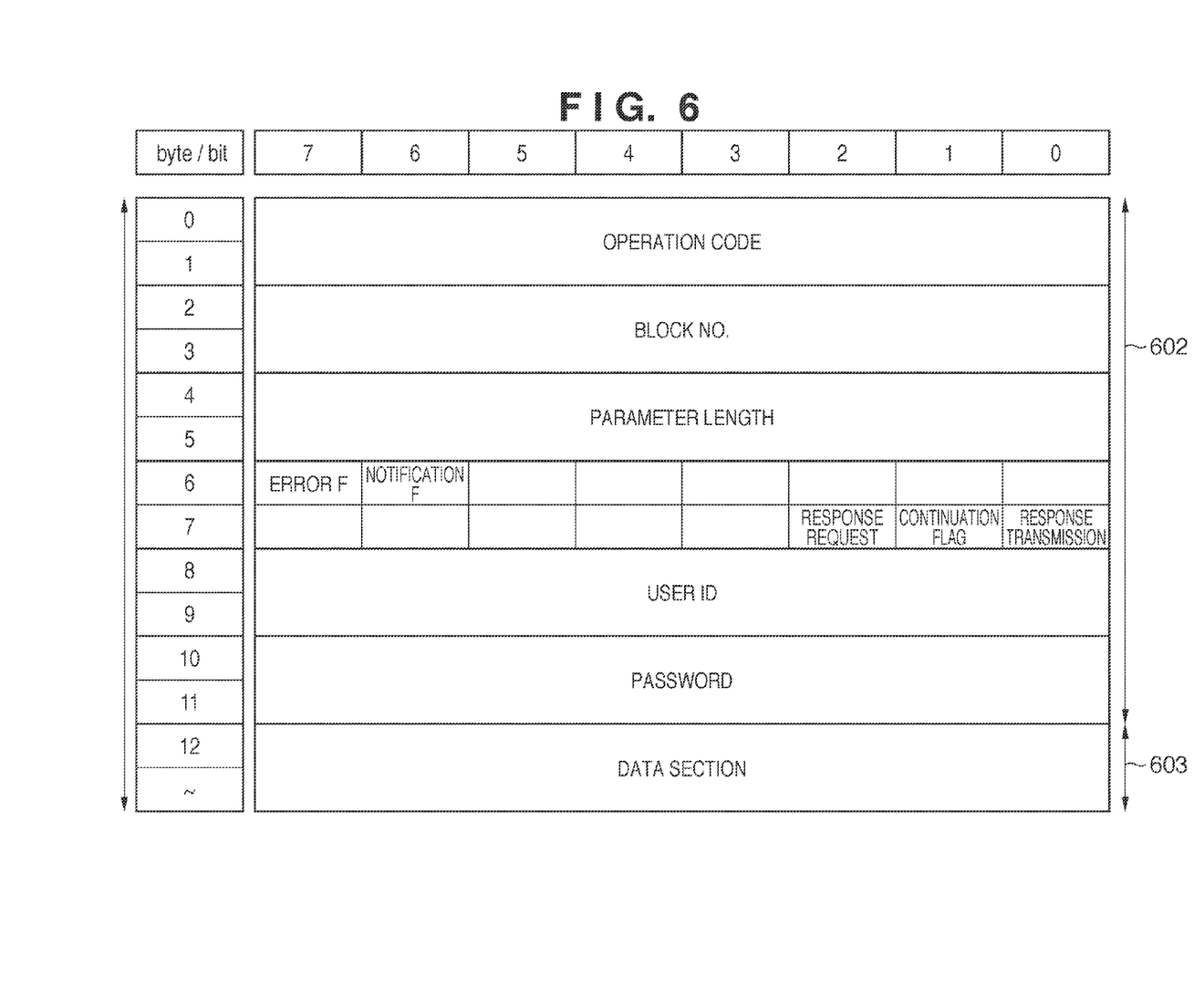
FIG. 6 is a diagram useful in describing the data format of each information block of a print job according to this embodiment.

FIG. 6 is a diagram useful in describing the data format of each information block of a print job according to this embodiment.

Each information block has been divided into a packet header 602 and a data section 603. The packet header 602 is a 12-byte fixed area and the data section 603 is an area whose size can be changed. The size of the data section 603 is determined by the parameter length of the packet header 602. An operation code composed of bytes 0 and 1 is an ID having a length of two bytes indicating the function of the packet. The operation code can take on the following values:

0x0201: job start operation
0x0202: job attribute setting operation
0x0204: PDL data send operation
0x205: job end operation
0x301: job control operation
0x090a: information acquisition operation Here "0x: indicates a hexadecimal number. In FIG. 6, the operation code in the packet header 602 of the block corresponding to the header 501 of the print job in FIG. 5 takes on the value of job start operation "0201". The operation code in the packet header 602 of the block corresponding to paper feed method 502, paper feed mode 503 and paper type 504 in FIG. 5 takes on the value of the job attribute setting operation "0202". The operation code in the packet header 602 of the block corresponding to the image data (PDL) 505 in FIG. 5 takes on the value of the PDL data send operation "0204". The operation code in the packet header 602 of the block corresponding to the print-job end code 506 takes on the value of the job end operation "0205".

The job control operation relates to job control and is appended to the packet header of the job control command transmitted from the information processing apparatus 306 to the multifunction peripheral 100. The operation code takes on the value of the job control operation "0301". This job control operation is used in a case where the print job that has been received by the multifunction peripheral 100 is controlled, such as by deleting, temporarily stopping or sequentially changing the print job. Further, the information acquisition operation is appended to the packet header of a request command for acquiring device information issued to the multifunction peripheral 100 by the dynamic configuration module of the information processing apparatus 306. This operation code takes on the value of the information acquisition operation "090a".

The block number of bytes 2 and 3 is a number used in order to achieve correspondence between a request and a response in a case where the side that transmitted the job packet requests a response. For example, a case will be described in which the information processing apparatus 306 transmits, in succession, job packets of Block Nos. 1, 2, 3. In a case where an error packet of Block No. 2 is sent back from the multifunction peripheral 100, the information processing apparatus 306 is capable of specifying the fact that an error occurred in the job packet transmitted second. The parameter length composed of bytes 4 and 5 is an area indicating the byte length of the data section from bit 12 onward, and is capable of indicating 0 to 64 bytes. The parameter length differs depending upon the attribute indicated by the packet header 602.

Bytes 6 and 7 constitute an area indicating various flags of a job packet and represent the values below.

Error flag (F): If this flag is "1", it indicates that an error of some kind has occurred in the multifunction peripheral 100. This error flag is attached to a response packet sent from the multifunction peripheral 100 to the information processing apparatus 306.

Notification flag (F): When this flag is "1", it does not indicate a response to a request packet from the information processing apparatus 306 but rather indicates that the information processing apparatus 306 will be notified of the fact that the multifunction peripheral 100 has some item of which notification is to be given.

Continuation flag: If this flag is "1", it indicates that since all data did not fit in the data section 603, the remaining data will be sent in the next job packet. The next job packet must be set to an operation code that is the same as that of the previous packet.

Response request: This is set to "1" in a case where a response from the information processing apparatus 306 to the multifunction peripheral 100 is necessary. When this bit is "0", a response is not sent back if the request packet has been processed normally. If an error occurs in the multifunction peripheral 100, a response packet in which the error flag is always made "1", irrespective of whether this response request flag is "0" or "1", is transmitted.

A user ID represented by bits 8 and 9 and a password represented by bits 10 and 11 are areas used in authentication when an operation that can be performed by a request packet is furnished with security. Bytes from byte 12 onward contain data (attribute parameters and PDL data) corresponding to the operation code. In the case of the above-mentioned job start operation and job end operation, the data section 603 does not exist.

Further, in the case of the job attribute setting operation, the job attribute ID and job attribute value desired to be set are set in the data section 603. The job attribute ID indicates an identifier corresponding to a job-related attribute or environment. An ID corresponding to the attribute of a job defined by ISO-10175 (DPA) (ISO: International Standardization Mechanism) is assigned in advance.

Typical job attributes and job attributes relating to information added on in this embodiment will now be described by way of example.

Job attribute IDs
0x0101: job name
0x0103: job owner name
0x016a: job size
0x0a01: paper feed method
0x0a03: paper feed mode
0x0a05: paper type information In a case where paper type information "0a05" has been designated as the job attribute ID, values corresponding to various media types (plain paper: "0", cardboard: "1", glossy paper: "2", backing paper: OHP: "4" and postcard" "5", etc.) are described in the job attribute values of data section 603. Further, in the case of the PDL data send operation, PDL data is placed in the data section 603. Since the data of one job packet has a maximum size up to that which can be accommodated by the parameter length, it is possible to store up to 64 KB. Data in excess of this is transmitted upon being divided into a plurality of PDL data send operations. In this case the continuation flag is made "1".

Next, a method of generating each block in the attribute packet generation module 304 will be described. The attribute packet generation module 304 generates the job packet of a print job at the time of print processing.

When the printer driver 308 is started up and print processing begins, the attribute packet generation module 304 also is started up. The attribute packet generation module 304 reads in a settings file and DEVMODE structure that have been stored in a memory (RAM or external storage device), with the contents having been set by the user interface of the printer driver, and recognizes the print settings of the print job that is undergoing processing.

Figure 7A:
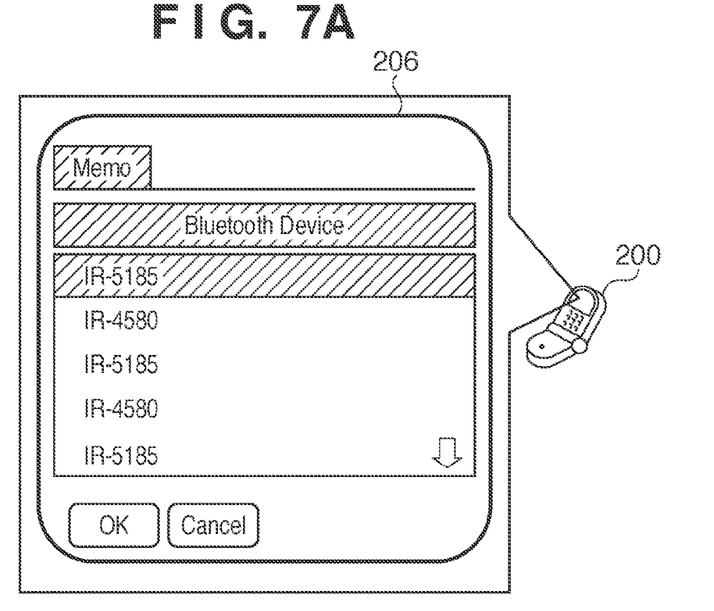
FIGS. 7A and 7B are diagrams illustrating examples of screens displayed on the display unit of the cellular phone according to this embodiment.

FIG. 7A is a diagram illustrating an example of a screen displayed on the display unit 206 of the cellular phone 200 in this embodiment. This will be described for a case where a device search is conducted when the cellular phone 200 and multifunction peripheral 100 perform pairing.

Using the fact that account information has been sent from the information processing apparatus 306 as a trigger, the multifunction peripheral 100 starts producing a pairing output for performing Bluetooth communication with the cellular phone 200. When a Bluetooth device search is conducted by the cellular phone 200, devices that are producing a pairing output are displayed besides the image forming apparatus that is the target of communication. In FIG. 7A, a plurality of devices capable of Bluetooth communication are being displayed in addition to the target device "IR-5185". Using this screen, the user selects the target Bluetooth device and inputs account information using the cellular phone 200. If account information being transmitted from the information processing apparatus 306 to the multifunction peripheral 100 matches the account information entered using the cellular phone 200 at this time, pairing is achieved, security print authentication is completed and printing starts. Generally, the account information has been registered in the multifunction peripheral 100 as a default value and the registered account information is input by pairing at the time of Bluetooth communication.

In this embodiment, the default account information of the multifunction peripheral 100 is replaced by the account information that has been sent from the information processing apparatus 306 or is added on and registered. Secure print is then executed from the information processing apparatus 306, after which the account value of the multifunction peripheral 100 is returned to the default value. Pairing in the form of Bluetooth communication continues at this time.

Figure 7B:
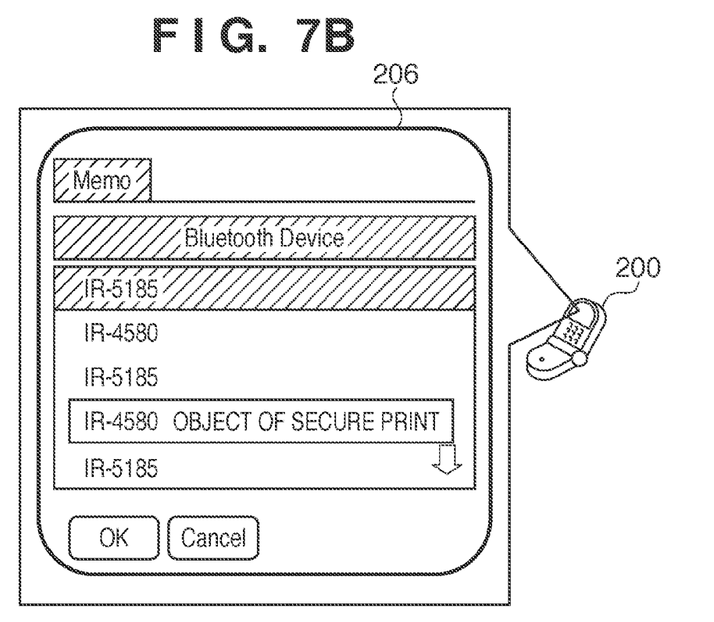

A second example of a display is shown in FIG. 7B. When a number of Bluetooth devices are displayed, there are cases where it is difficult to select the target Bluetooth device. In such cases a character string indicating that a device is one to which secure print is to be applied is displayed, as shown in FIG. 7B, upon appending it to the Bluetooth address of the multifunction peripheral 100 to which the secure print job is being transmitted by the user. This makes it easy to find the address ("IR-4580" in the illustrated example) of the target device.

Figure 8A:
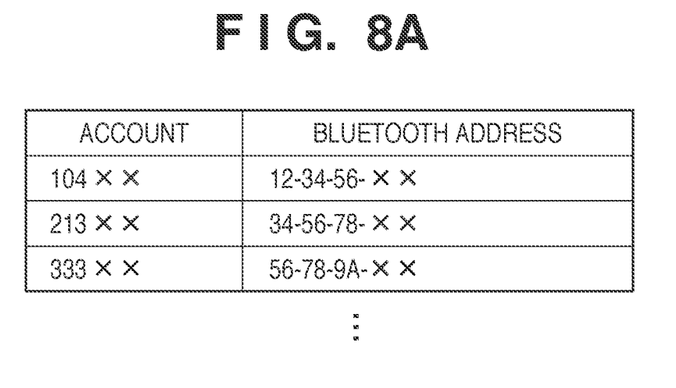
FIG. 8A is a diagram illustrating an example of a table correlating user accounts and Bluetooth addresses of cellular phones belonging to the account owners.

FIG. 8A is a diagram illustrating an example of a table correlating user accounts and Bluetooth addresses of cellular phones belonging to the account owners. The user account has been input using the information processing apparatus 306 and is used for secure print authentication and as a user account necessary when performing pairing in Bluetooth communication. It does not matter if the user account is PIN information or a password.

By referring to such a table, the cellular phone of the user who is capable of designating the account can be specified. As a result, a character string (see FIG. 7B) can be displayed upon being attached only to the cellular phone of the user for which secure print is to be performed. It should be noted that in a case where Bluetooth communication pairing has been implemented from another cellular phone, the character string indicating that secure print is being executed is not displayed on this cellular phone. Rather, the display presented is identical with that of the other Bluetooth devices displayed.

The table shown in FIG. 8A is created in the following manner: A user account is input using the printer driver 308 of the information processing apparatus 306 and is transmitted from the information processing apparatus 306 to the multifunction peripheral 100 as a portion of the header information of the image data. Upon receiving this information, the CPU 101 of the multifunction peripheral 100 outputs to the cellular phone 200 a signal that is necessary when a search for Bluetooth devices is conducted. The cellular phone 200 conducts a search for Bluetooth devices and presents the display shown in FIG. 7A or 7B. In response, the user of the cellular phone 200 selects the target multifunction peripheral 100 and inputs this account information. At this time the multifunction peripheral 100 correlates the Bluetooth address and the user account information and stores the result in a non-volatile memory of the multifunction peripheral 100 in the form of the table shown in FIG. 8A. As a result, when access is performed from the second time onward, the Bluetooth address of the cellular phone 200 can be specified by referring to the table of FIG. 8A. Thus, a character string can be added to a device name displayed on the cellular phone 200 and this allows a target multifunction peripheral to be retrieved with facility, as in FIG. 7B.

Figure 8B:
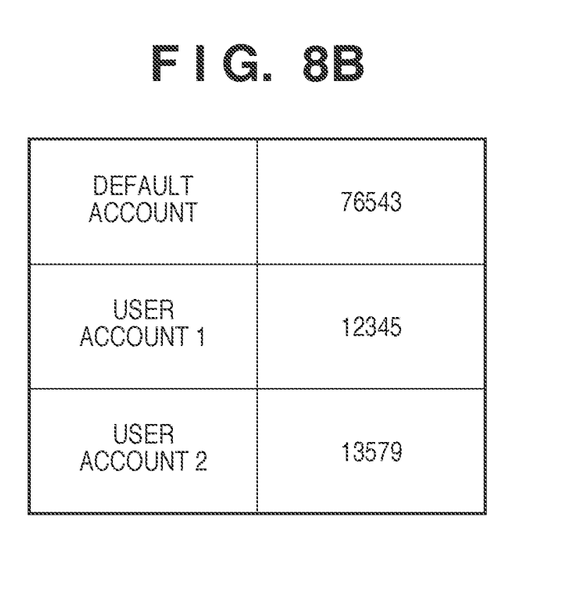
FIG. 8B is a diagram illustrating an example of account information.

FIG. 8B is a diagram illustrating an example of account information.

A default value ("76543" in FIG. 8B) of an account for Bluetooth communication has been set in a non-volatile memory of the multifunction peripheral 100. It is possible for this value to be changed as by an administrator. In a case where user account information for secure print has been sent from the information processing apparatus 306, as in this embodiment, the user account value "12345" for Bluetooth communication is stored separately. It may be arranged so that pairing can be performed even with "76543" or "12345"

as the default value, and the default value "76543" may be changed to "12345". It should be noted that in a case where the default value has been changed, it is necessary to restore the original default value "76543" when secure print ends.

Figure 9:
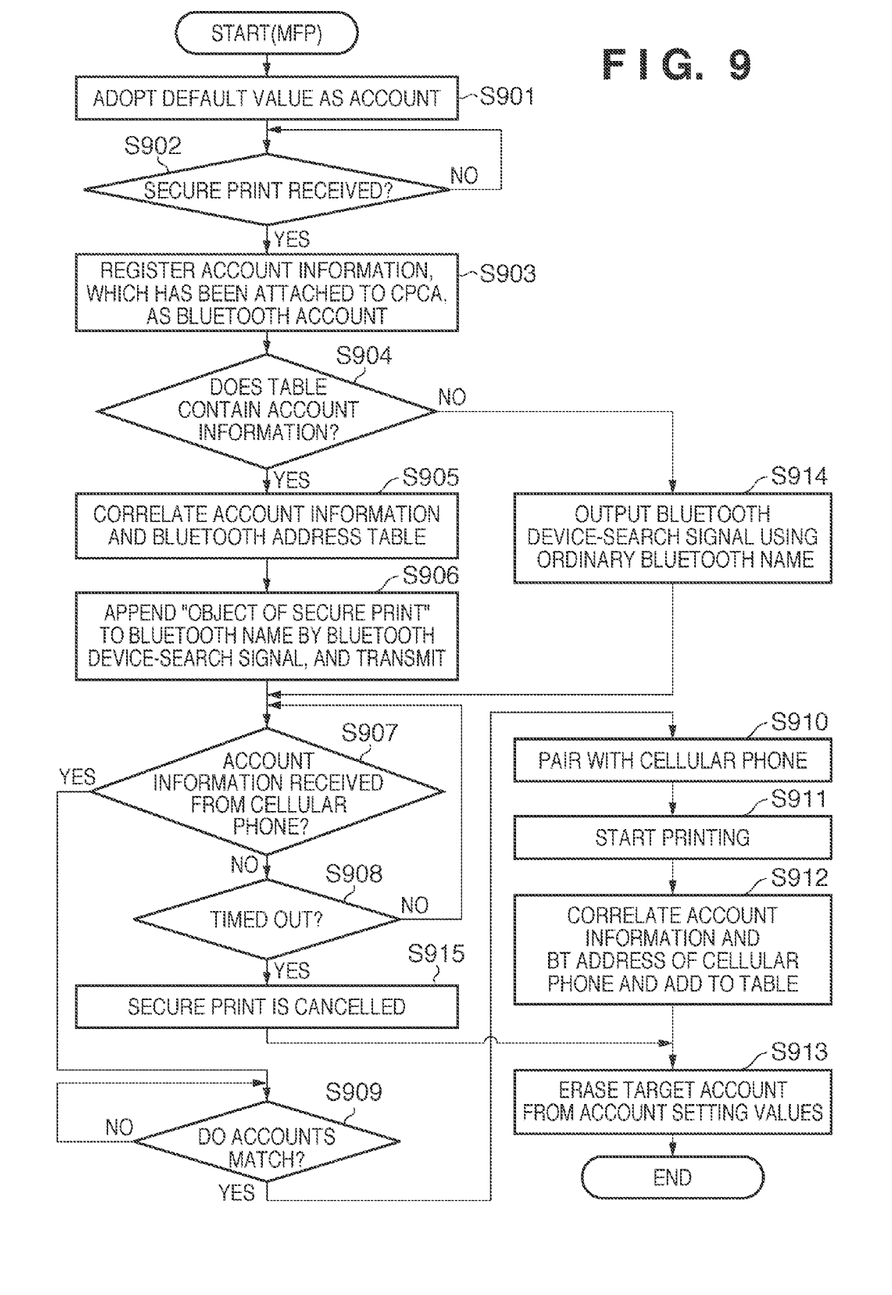
FIG. 9 is a flowchart for describing an example of processing by a multifunction peripheral in an image forming system according to this embodiment.
Figure 10:
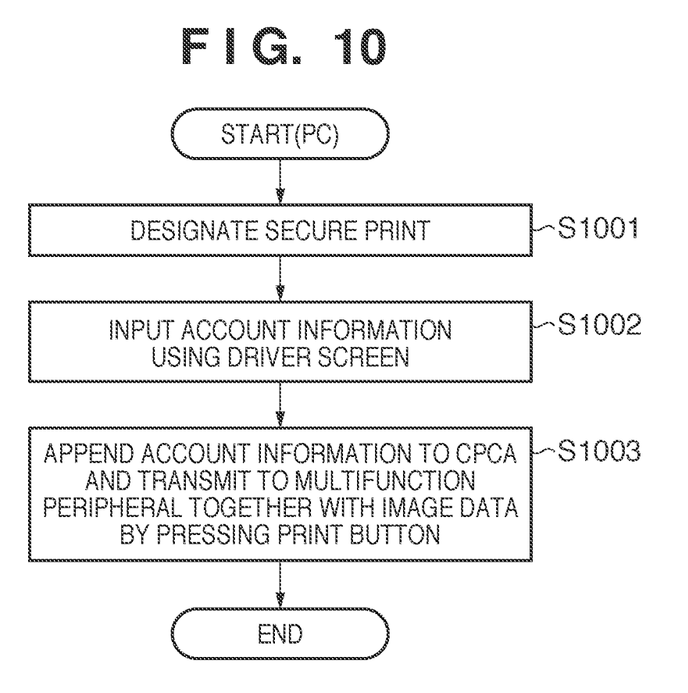
FIG. 10 is a flowchart for describing an example of processing by an information processing apparatus in an image forming system according to this embodiment.
Figure 11:
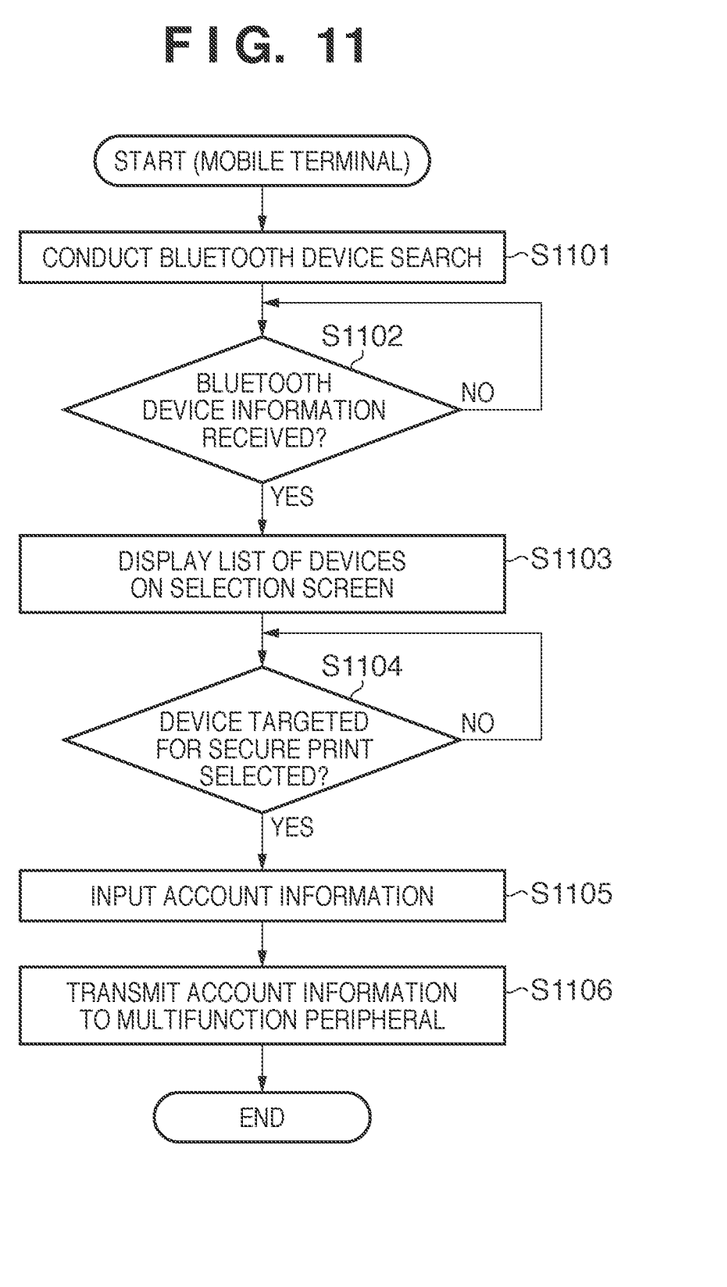
FIG. 11 is a flowchart for describing an example of processing by a cellular phone in an image forming system according to this embodiment.

FIGS. 9 to 11 are flowcharts for describing an example of processing in an image forming system according to an embodiment of the present invention, in which FIG. 9 is a flowchart for describing processing by the multifunction peripheral 100, FIG. 10 a flowchart for describing processing by the information processing apparatus 306 and FIG. 11 a flowchart for describing processing by the cellular phone 200.

In step S901 in FIG. 9, account information necessary when pairing in Bluetooth communication is carried out is kept as the default of the multifunction peripheral 100. For example, in the case of FIG. 8B, the account information is "76543". Next, in step S902, when the designation of secure print is received from the information processing apparatus 306, the multifunction peripheral 100 receives information (CPCA), such as the header 501 of the print job, together with image information. The secure print designation is issued in step S1001 in FIG. 10.

Next, in step S903, the account information that has been attached to the received CPCA is stored on the hard disk 103 as a Bluetooth account. This account information is registered as an account for Bluetooth communication until the end of secure print requested from the information processing apparatus 306. In step S903 the default account may be changed to the received account value or may be registered anew in addition to the default account and pairing may be allowed even with the present account together with the default account. It should be noted that in the case where the default account is changed in step S903, control for restoring the default account in a later step S913 will be necessary. Thus, in step S903, a state is obtained in which the multifunction peripheral 100 can be searched from the cellular phone 200 and can receive data from the cellular phone 200.

Next, in step S904, the multifunction peripheral 100 determines whether the account information received from the information processing apparatus 306 in step S903 has been registered in the table shown in FIG. 8A. If the account information has not been registered in the table of FIG. 8A, i.e., if this is the first time secure print has been designated from the information processing apparatus 306, the process proceeds to step S914. In step S914, the multifunction peripheral 100 outputs its Bluetooth device name wirelessly from the communication controller 108 as information necessary for a device search when pairing is performed. The process then proceeds to step S907. If the account information has been registered in the table, on the other hand, the process proceeds from step S904 to step S905, where the multifunction peripheral 100 refers to this table and specifies the Bluetooth address that corresponds to this account information. Then, in step S906, the multifunction peripheral 100 appends a character string such as "OBJECT OF SECURE PRINT" to the device name as shown in FIG. 7B and then transmits the result to the specified cellular phone 200. The process then proceeds to step S907. As a result, the user of the cellular phone 200 is capable of searching and retrieving the Bluetooth device (multifunction peripheral 100), which is the object of secure print, rapidly and reliably.

In step S907, the multifunction peripheral 100 waits for receipt, from the cellular phone 200, of a signal indicating that the multifunction peripheral 100 has been selected by the device search, and of the account information for performing pairing. The account information is received by being transmitted from the cellular phone 200 in step S1106 in FIG. 11. If not received, then the process advances to step S908, and the multifunction peripheral 100 determines whether the account information has been received by the time a fixed period elapses from receipt of the secure print job from the information processing apparatus 306. If the fixed period has not elapsed in step S908, i.e., if time-out has not occurred, then the process returns to step S907. When the account information is received in step S907, the process proceeds to step S909. If time-out occurs in step S908, the process proceeds to step S915. Here secure print is cancelled or output of the device-search signal in steps S914 and S906 is halted. The process then proceeds to step S913. It should be noted that processing may be exited as is after secure print is cancelled in step S915.

In step S909, the multifunction peripheral 100 determines whether the account information that has been sent from the cellular phone 200 matches the account information that was appended to the CPCA from the information processing apparatus 306 at the time of secure print. If a match is determined, the process proceeds to step S910. Here pairing with the cellular phone 200 is achieved, after which Bluetooth communication is enabled between the cellular phone 200 and multifunction peripheral 100.

Next, in step S911, the image data that has been stored in RAM 104 or on hard disk 103 in the multifunction peripheral 100 starts being printing owing to achievement of pairing in step S910. Next, in step S912, user account data and the Bluetooth address are correlated and stored as an addition to the table of FIG. 8A if no account information was found in this table in step S904. As a result, from the second time onward, control can proceed from step S904 to step S905. Next, the process proceeds to step S913. Here, if the default value was changed to the present account in step S903, then the account setting value of the default is restored and the present account information is deleted. If an addition was made to the default value in step S903, the processing of step S913 can be skipped.

FIG. 10 is a flowchart describing the processing executed by the information processing apparatus 306 in this embodiment.

In step S1001, the user designates the fact that printing based upon secure print is desired. In step S1002, the user selects execution of secure print using the screen presented by the installed printer driver 308. At this time the user can set account information at will using the printer driver 308. Next, in step S1003, the user presses a start button on the screen of the printer driver. As a result, the above-mentioned account information is appended to the header, which has been generated by the attribute packet generation module 304, and is transmitted to the multifunction peripheral 100 together with the image information generated by the PDL generation module 303.

FIG. 11 is a flowchart describing processing executed by the cellular phone 200 according to this embodiment.

First, in step S1101, the cellular phone 200 conducts a Bluetooth device search for the multifunction peripheral 100 that will execute secure print. At this time the multifunction peripheral 100 that has been selected by the printer driver 308 has received the user account information from the information processing apparatus 306. Various setting values of this print job have been stored in the multifunction peripheral 100. Accordingly, the prevailing state is one in which the multifunction peripheral 100 is outputting the device-search signal to the cellular phone 200 in step S906 or S914 in FIG. 9. Next, in step S1102, the cellular phone 200 receives from the multifunction peripheral 100 device information indicating that communication is possible. The process then proceeds to step S1103, where the screen shown in FIG. 7A or 7B is displayed on the console unit 207 of the cellular phone 200. Then, in step S1104, the cellular phone 200 waits for the user to select the multifunction peripheral 100, which will execute secure print, using the screen on the console unit 207. When the multifunction peripheral 100 is selected, the process proceeds to step S115. Here the cellular phone 200 displays a screen for inputting account information for pairing required in order to execute Bluetooth communication. The cellular phone 200 then waits for the user to input a setting identical with that of the account information entered using the printer driver 308 of the information processing apparatus 306. When the user thus inputs account information, the process proceeds to step S1106. Here the cellular phone 200 transmits this information to the multifunction peripheral 100 wirelessly via the short-range wireless communication unit 210.

In accordance with this embodiment, as described above, it is possible to provide a more user-friendly secure print technique in which operation performed at a multifunction peripheral (image forming apparatus) can be omitted when use of a cellular phone is adopted for secure print authentication.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-175736, filed Aug. 4, 2010, which is hereby incorporated by reference herein in its entirety.

What is claimed is:

1. An image forming apparatus capable of communicating with an information processing apparatus and a mobile terminal, comprising:
a reception unit configured to receive print data and account information, which is for placing the image forming apparatus in a state in which wireless communication is possible, from the information processing apparatus;
a storage unit configured to store the print data and the account information received by the reception unit;
an authentication information reception unit configured to receive authentication information from the mobile terminal after the state in which wireless communication with the mobile terminal is possible has been established using the account information stored in the storage unit; and
a print control unit configured to start printing of the print data stored in the storage unit in a case where the authentication information received by the authentication information reception unit matches the account information stored in the storage unit.

2. The apparatus according to claim 1, further comprising:
a holding unit configured to correlate and hold the account information stored in the storage unit and an address of the mobile terminal; and
a transmitting unit which, in a case where the account information stored in the storage unit is being held in the holding unit, transmits an address of the image forming apparatus, with specific information attached thereto, to the mobile terminal having the address corresponding to the account information.

3. The apparatus according to claim 1, further comprising:
a determination unit configured to determine whether or not authentication information received by the authentication information reception unit corresponds to the account information stored in the storage unit; and
a pairing unit configured to pair the image forming apparatus and the mobile terminal in a case where the determination unit has determined that the authentication information received by the authentication information reception unit matches the account information stored in the storage unit.

4. The apparatus according to claim 1, wherein the mobile terminal and the image forming apparatus perform communication based upon the Bluetooth standard.

5. A control method of controlling an image forming apparatus capable of communicating with an information processing apparatus and a mobile terminal, the method comprising:
receiving print data and account information, which is for placing the image forming apparatus in a state in which wireless communication is possible, from the information processing apparatus;
storing the print data and the account information received in the receiving step into a memory;
receiving authentication information from the mobile terminal after the state in which wireless communication with the mobile terminal is possible has been established using the account information stored in the memory; and
printing based upon the print data stored in the memory in a case where the received authentication information corresponds to the account information stored in the memory.

* * * * *